(12) United States Patent
Park et al.

(10) Patent No.: US 6,922,226 B2
(45) Date of Patent: Jul. 26, 2005

(54) LIQUID CRYSTAL DISPLAY DEVICE IMPLEMENTING IMPROVED ELECTRICAL LINES AND THE FABRICATING METHOD

(75) Inventors: Sung-Il Park, Kyonggi-do (KR); Won-Gyun Youn, Kyoungsangbuk-do (KR); In-Duk Song, Kyoungsangbuk-do (KR); Keuk-Sang Kwon, Kyoungsangbuk-do (KR); Yong-Ik Bang, Taegu (KR)

(73) Assignee: LG. Philips LCD Co. Ltd., Seoul (KR)

( * ) Notice: Subject to any disclaimer, the term of this patent is extended or adjusted under 35 U.S.C. 154(b) by 0 days.

(21) Appl. No.: 09/750,342

(22) Filed: Dec. 29, 2000

(65) Prior Publication Data
US 2001/0026345 A1 Oct. 4, 2001

(30) Foreign Application Priority Data

| Dec. 31, 1999 | (KR) | ......................................... | 1999-67851 |
| Apr. 7, 2000 | (KR) | ......................................... | 2000-18093 |
| May 29, 2000 | (KR) | ......................................... | 2000-29104 |

(51) Int. Cl.[7] .......................................... G02F 1/1345
(52) U.S. Cl. ......................................... 349/149; 349/54
(58) Field of Search ........................ 349/54, 149, 152, 349/150, 151, 153

(56) References Cited

U.S. PATENT DOCUMENTS 5,684,555 A * 11/1997 Shiba et al. ................. 349/149
5,945,984 A * 8/1999 Kuwashiro ................... 345/206
5,995,189 A * 11/1999 Zhang .......................... 349/153
6,400,438 B1 * 6/2002 Noritake et al. ............. 349/149
6,587,160 B2 * 7/2003 Lee et al. ..................... 349/40

* cited by examiner

Primary Examiner—Robert H. Kim
Assistant Examiner—Thoi V. Duong
(74) Attorney, Agent, or Firm—Birch, Stewart, Kolasch & Birch, LLP

(57) ABSTRACT

The present invention discloses a liquid crystal display device, including upper and lower substrates with a liquid crystal layer interposed therebetween; a sealant between the upper and lower substrates; a plurality of source and gate pads on the lower substrate; a plurality of gate and data lines on the lower substrate, each gate line being electrically connected with the corresponding gate pad, each data line being electrically connected with the corresponding source pad; a gate insulating layer between the gate lines and the data lines; a source PCB electrically connected with the plurality of source pads; a gate PCB electrically connected with the plurality of gate pads; and a plurality of transmitting wires on the lower substrate, the transmitting wires being electrically connected with the gate and source pads across the sealant such that the source PCB is electrically connected with the gate PCB. The liquid crystal display device further includes a repair wire to repair the gate transmitting wires, and dummy patterns to protect the gate transmitting wires from a mechanical damage of a scribing and breaking force.

14 Claims, 13 Drawing Sheets

LIQUID CRYSTAL DISPLAY DEVICE IMPLEMENTING IMPROVED ELECTRICAL LINES AND THE FABRICATING METHOD

CROSS REFERENCE

This application claims the benefit of Korean Patent Application Nos. 1999-67851, 2000-18093, and 2000-29104 respectively filed on Dec. 31, 1999, Apr. 7, 2000, and May 29, 2000 under 35 U.S.C. § 119, the entirety of which is hereby incorporated by reference.

BACKGROUND OF THE INVENTION

1. Field of the Invention

The present invention relates to a liquid crystal display (LCD) device, and more particularly, to a liquid crystal display device implementing improved configuration of electrical lines and a fabricating method thereof.

2. Description of Related Art

A typical liquid crystal display device uses optical anisotropy and polarization properties of liquid crystal molecules. The liquid crystal molecules have a definite orientational order in arrangement resulting from their thin and long shapes. The arrangement direction of the liquid crystal molecules can be controlled by supplying an electric field to the liquid crystal molecules. In other words, as the arrangement direction of the liquid crystal molecules is changed, the arrangement of the liquid crystal molecules also changes. Since Incident light is refracted to the arrangement direction of the liquid crystal molecules due to the optical anisotropy of the arranged liquid crystal molecules image data can be displayed.

By now, an active matrix LCD that the thin film transistors and the pixel electrodes are arranged in the form of a matrix is most attention-getting due to its high resolution and superiority in displaying moving video data.

FIG. 1 shows the configuration of a typical TFT-LCD device. The TFT-LCD device 1 includes upper and lower substrates 10 and 20 with a liquid crystal 50 interposed therebetween. The upper and lower substrates 10 and 20 are called a color filter substrate and an array substrate, respectively.

In the upper substrate 10, on a surface opposing the lower substrate 20, black matrix 12 and color filter layer 14 that includes a plurality of red (R), green (G), and blue (B) color filters are formed in shape of an array matrix such that each color filter is surrounded by the black matrix 12. Further on the upper substrate 10, a common electrode 16 is formed and covers the color filter layer 14 and the black matrix 12.

In the lower substrate 20, on a surface opposing the upper substrate 10, a TFT "T", as a switching device, is formed in shape of an array matrix corresponding to the color filter layer 14, and a plurality of crossing gate and data lines 26 and 28 are positioned such that each TFT is located near each cross point of the gate and data lines 26 and 28. Further in the lower substrate 20, a plurality of pixel electrodes 22 are formed on an area defined by the gate and data lines 26 and 28. The area there defined is called a pixel portion "P". The pixel electrode 22 is a transparent conductive metal such as indium tin oxide (ITO).

The above-mentioned upper and lower substrate 10 and 20 are attached to each other using a sealant, and thereafter, the liquid crystal 50 is injected between the upper and lower substrates 10 and 20.

When the TFT "T" is the thin film transistor, which includes source, drain and gate electrodes (not shown), the gate line 26 transmits scanning signals to the gate electrode while the data line 28 transmits video signals to the source electrode. The video signals change alignments of the liquid crystal molecules according to the scanning signals such that the LCD device displays various gray levels.

In a conventional fabricating process for the LCD panel, at least two LCD panels are fabricated employing a large-sized upper substrate as the upper substrate 10. Thereafter, the large sized upper substrate is scribed and broken into at least two upper substrates 10 of FIG. 1 such that at least two independent LCD panels shown in FIG. 1 are produced. The above-mentioned process is called a scribing and breaking process.

The typical LCD device has a drive IC (Integrated Circuit) on its lower substrate. The drive IC serves to apply electric signals to each electric line formed on the lower substrate. To install the drive IC on the lower substrate, various methods, for example, such as chip on board (COB), chip on glass (COG), and tape carrier package (TCP) methods are adopted.

The COB method is conventionally adopted for a segment type LCD device, or a LCD panel having a low resolution. Since the segment type LCD device or the low resolution LCD panel uses a small number of leads, the drive IC thereof has also a small number of leads. Therefor, the driver IC thereof is first installed on a printed circuit board (PCB) having a plurality of leads, and the leads of the PCB are connected with the LCD panel via a proper method, which is relatively simple.

However, as the LCD devices become to have a high resolution, a great number of leads are adopted for the drive IC. When the drive IC has a great number of leads, it is difficult to install the drive IC on the above-mentioned PCB.

In another method, the COG method, the drive IC is directly installed on the LCD panel without interposing the PCB. Therefore, the connection between the drive IC and the LCD panel is stable, and a minute pitch is applicable for the installation of the drive IC. The COG method employs a multi-layered flexible printed circuit (FPC) instead of the PCB. The multi layered FPC contacts the LCD panel via an anisotropic conductive film (ACF) and transmits input signals to the drive IC.

The above-mentioned COG method has advantages of low cost and high stability. However, since a pad of the LCD panel needs an additional area to install the drive IC, the LCD panel should be enlarged. In addition, when the COG method is adopted for the LCD panel, it is difficult to repair against troubles of the drive IC or terminal lines of the LCD panel.

In another method, the TCP method, the drive IC is installed on a polymer film. The TCP method is widely used for the LCD device as well as a mobile phone that need small, thin, and light electrical packages.

FIG. 2 shows a conventional LCD device adopting the COG method.

As shown, a data drive circuit 27 and a gate drive circuit 29 are formed around the lower substrate 20 of the LCD panel 1. The gate drive circuit 29 is electrically connected with the gate lines 26 of FIG. 1, while the data drive circuit 27 is electrically connected with the data lines 28 of FIG. 1. In another aspect, the data and gate drive circuits 27 and 29 are electrically connected with source PCB 33 and gate PCB 31, respectively. The data and gate drive circuits 27 and 29 respectively apply the video and scanning signals from the source and gate PCBs 33 and 31 to the data and gate lines 28 and 26 of FIG. 1.

Still in FIG. 2, the data and gate drive circuits 27 and 29 are directly installed on the lower substrate 20, and a plurality of FPCs 35 are used to connect the drive circuits 27 and 29 with the PCBs 33 and 31. At this point, the FPCs 35 serves as input terminals for transmitting the input signals from the PCBs to the drive circuits. In a reel chip on glass method, one edges of the PCBs 31 and 33 overlap opposing edges of the lower substrate 20, and input terminals are directly formed on the lower substrate 20 to connect the PCBs and the drive circuits.

Further, the data drive circuit 27 receives the video signals directly from the source PCB 33, while the gate drive circuit 29 receives the scanning signals from the source PCB 33 via the gate PCB 31. At this point, to transmit scanning signals from the source PCB 33 to the gate PCB 31, a transmitting FPC 37 is used. The transmitting FPC 37 transmits the gate signals including $V_{com}$, $V_{gh}$, $V_{gl}$, $V_{cc}$, $G_{sp}$, $G_{sc}$, $C_{oe}$, and $G_{nd}$ to the gate PCB 31.

As explained above, since the COG method adopts an additional element, the transmitting FPC, a material cost of the LCD device increases. Further, soldering errors additionally occur in connecting the transmitting FPC 37 with the gate and source FPCs 31 and 33.

FIGS. 3 and 4 illustrate a conventional TCP method. As shown, a source TCP 36 and a gate TCP 34 are used to respectively connect the source and gate PCB 33 and 31 with the data and gate lines 28 and 26. The source and gate TCP 36 and 34 respectively have the data and gate drive circuits (data and gate drive ICs) in themselves as shown in FIG. 4. As shown in FIG. 4, the data or gate drive IC 17 is installed on a polymer film 19, and the polymer film 19 is connected with the lower substrate 20 and the gate or source PCB 31 or 33 via an anisotropic conductive films 18.

Returning to FIG. 3, similarly to the COG method of FIG. 2, the transmitting FPC 37 is used to transmit scanning signals from the source PCB 33 to the gate PCB 31. That is to say, the TCP method also has the same problem as what is mentioned in the explanation of the COG method.

SUMMARY OF THE INVENTION

It is therefore an object of the present invention to reduce the detectable difference in brightness resulting from the difference in distance between pixel electrodes and data lines at the boundaries of exposure regions for a liquid crystal display device having a larger display area.

For the above object, present invention provides a liquid crystal display device, which includes upper and lower substrates with a liquid crystal layer interposed therebetween; a sealant between the upper and lower substrates; a plurality of source and gate pads on the lower substrate; a plurality of gate and data lines on the lower substrate, each gate line being electrically connected with the corresponding gate pad, each data line being electrically connected with the corresponding source pad; a gate insulating layer between the gate lines and the data lines; a source PCB electrically connected with the plurality of source pads; a gate PCB electrically connected with the plurality of gate pads; and a plurality of transmitting wires on the lower substrate, the transmitting wires being electrically connected with the gate and source pads across the sealant such that the source PCB is electrically connected with the gate PCB.

The device further includes a plurality of switching devices.

The gate transmitting wires include at least eight electrical wires.

The device further includes a plurality of dummy pads between the adjacent gate pads and between the adjacent source pads.

The device further includes repair wire crossing with each gate transmitting wire with the gate insulating layer interposed between the repair wire and the gate transmitting wire. A specific resistance of the repair wire is below 10 $\mu\Omega$/cm inclusive. The repair wire is positioned in a region defined by the sealant, or the repair wire is positioned across the sealant. The repair wire includes first and second closed roofs, the first closed roof being formed along first edge of the upper substrate, the second closed roof being formed along second edge of the upper substrate.

The device further includes first and second repair wire, the first repair wire crossing with each of the source pads with the gate insulating layer interposed therebetween, the second repair wire crossing with each of the gate pads with the gate insulating layer interposed therebetween. A specific resistance of the first and second repair wires is below 10 $\mu\Omega$/cm inclusive.

The device further includes first and second dummy patterns on the lower substrate, the first dummy pattern being positioned along a first edge of the upper substrate, the second dummy pattern being positioned along a second edge of the upper substrate, the each dummy pattern having at least the same height as the gate transmitting wire.

The device further includes auxiliary dummy patterns over the first and second dummy patterns.

In another aspect, the present invention provides a method of fabricating a liquid crystal display device, the method includes preparing first and second substrates; forming a plurality of gate lines, gate pads, and dummy patterns on the first substrate; forming a gate insulating layer on the gate lines, gate pads, and dummy patterns; forming a plurality of data lines, data pads, and gate transmitting wires on the gate insulating layer; forming a passivation layer on the data lines, the data pads, and the gate transmitting wires; forming a sealant on the first substrate; attaching the first and second substrates; scribing and breaking the second substrate; and forming a liquid crystal layer between the first and second substrates.

The method further includes a step of forming auxiliary dummy patterns over the dummy patterns before the passivation layer is formed.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to the preferred embodiment of the present invention, example of which is illustrated in the accompanying drawings.

First Preferred Embodiment

Figure 5:
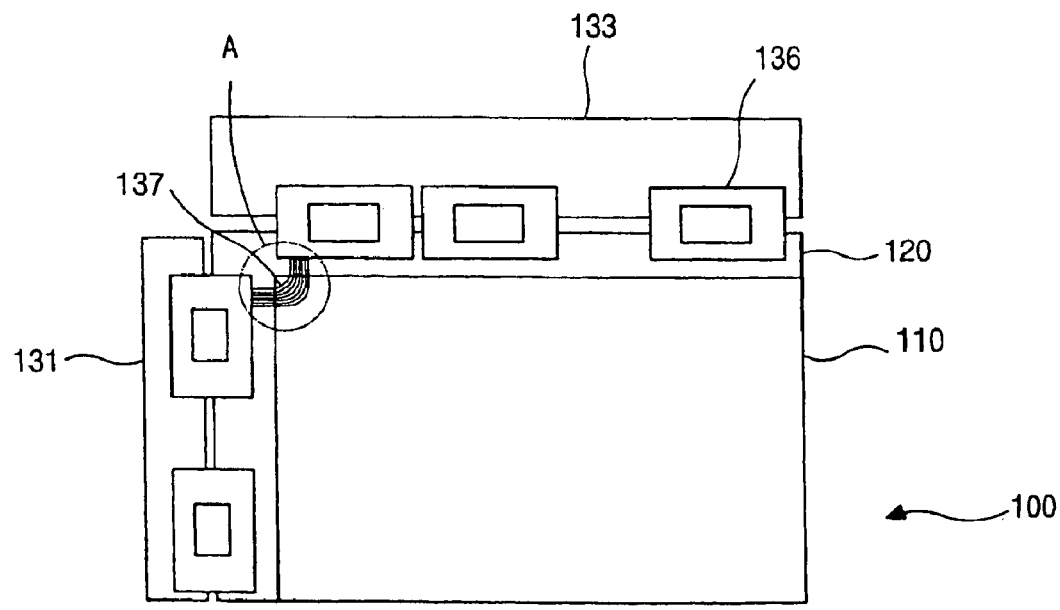
FIG. 5 is a plane view of a LCD device according to a first preferred embodiment of the present invention.

FIG. 5 is a plane view of a LCD device according to the first preferred embodiment of the present invention.

Figure 6:
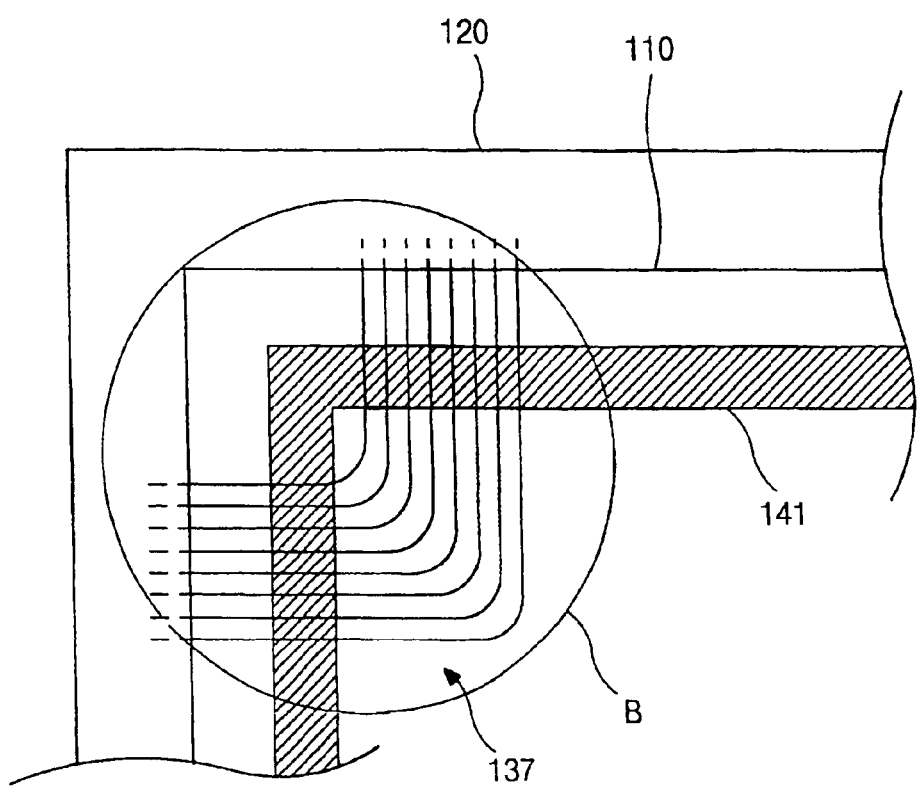
FIG. 6 is an expanded plane view of a portion "A" of FIG. 5.

As shown, an upper substrate 110 is positioned over a lower substrate 120 with a liquid crystal (not shown) interposed between the upper and lower substrates 110 and 120. A sealant 141 shown in FIG. 6 is used to attach the lower and upper substrates 120 and 110. Around edges of the lower substrate 120, gate and source PCBs 131 and 133 are positioned. Gate and source TCPs 134 and 136 electrically connect, respectively, the gate and source PCBs 131 and 133 with a LCD panel 100 including the upper and lower substrates 110 and 120. A gate transmitting wires 137 electrically connects the gate TCP 134 with the source TCP 136 such that the source PCB 133 is electrically connected with the gate PCB 131. The gate transmitting wires 137 are preferably selected from a group consisting of aluminum (Al), molybdenum (Mo), chromium (Cr), alloys thereof and the like.

FIG. 6 is an expanded plane view of a portion "A" of FIG. 5.

As shown, both ends of the gate transmitting wires 137 are positioned on edges of the lower substrate 120, while the gate transmitting wires 137 are preferably bent to be positioned across the sealant 141 that is formed between the lower and upper substrates 120 and 110. Since the gate transmitting wires 137 are covered and fixed by the lower and upper substrates 120 and 110, they are shielded from exterior effects.

Figure 7:
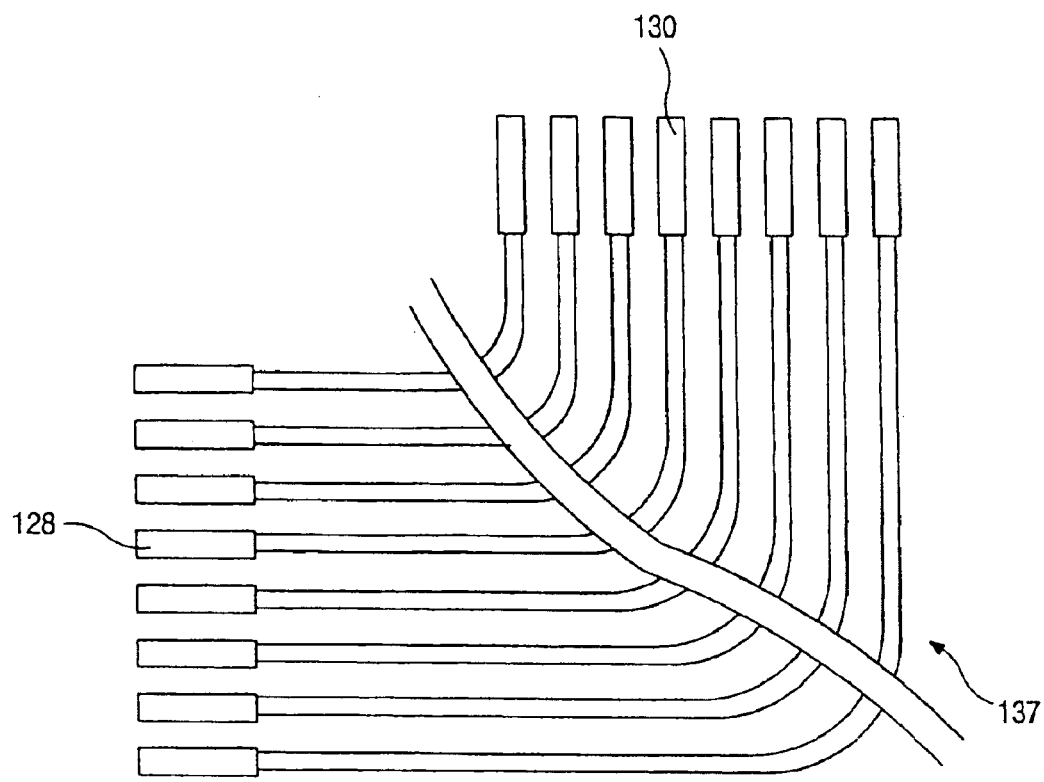
FIG. 7 is an expanded plane view of a portion "B" of FIG. 6.

FIG. 7 is an expanded plane view of a portion "B" of FIG. 6.

As shown, the gate transmitting wires preferably include at least eight electric wires and transmit gate signals from the source PCB 133 to the gate PCB 131. The gate signals include $V_{com}$, $V_{gh}$, $V_{gl}$, $V_{cc}$, $G_{sp}$, $G_{sc}$, $C_{oe}$, and $G_{nd}$. Each gate transmitting wire 137 is electrically connected with gate and source pads 128 and 130, which respectively serve as output and input terminals of the gate transmitting wires 137. A specific resistance of the gate transmitting wires 137 is preferably below 10 $\mu\Omega$/cm inclusive, and a resistance of each gate transmitting wire 137 is preferably below 100 $\Omega$ inclusive.

Further, dummy pads (not shown) are preferably formed in gaps between adjacent gate pads 128 and between adjacent source pads 130. When the gate transmitting wires 137 respectively transmit different signals having different voltages, the dummy pads prevent an abnormal electrical interaction between the adjacent gate transmitting wires.

Furthermore, since the gate transmitting wires are covered by the lower and upper substrates 120 and 110, they are protected from exterior humidity or scratch.

Second Preferred Embodiment

The second preferred embodiment of the present invention provides a repair wire to repair a short line occurring in the gate transmitting wires provided by the first preferred embodiment of the present invention.

Figure 8:
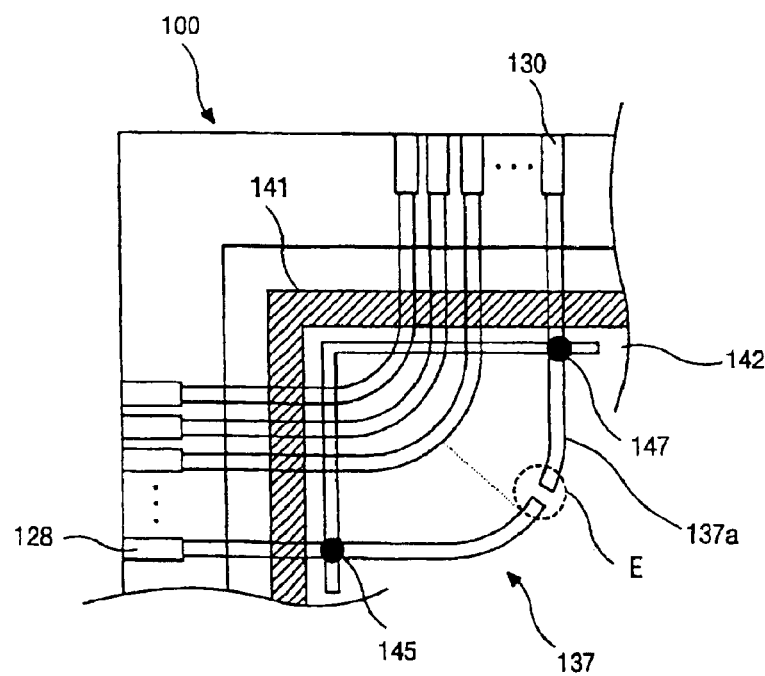
FIG. 8 is a partial expanded view of a liquid crystal display device according to a second preferred embodiment of the present invention.

As shown in FIG. 8, over the gate transmitting wires 137, the repair wire 142 is formed with an insulating layer (not shown) interposed between the gate transmitting lines 137 and the repair wire 142. The repair wire 142 is inwardly spaced apart from the sealant 141 and overlaps two different portions of each gate transmitting wire 137. When a last gate transmitting wire 137a has a short line at a portion "E", the repair wire 142 and the last gate transmitting wire 137a are welded together at their first and second cross points 145 and 147 using a laser and the like. By the above-mentioned repair, the voltage signal is transmitted again via the repair wire 142. The last gate transmitting wire 137a is only an example. When the other of the gate transmitting wires 137 has the short line, it is repaired similar to the above-mentioned last gate transmitting wire 137a.

Third Preferred Embodiment

In a scribing and breaking process to separate at least two LCD panels independently from each other, a large sized upper substrate is scribed and broken by force into a plurality of the upper substrates 110 such that a plurality of the LCD panels are fabricated. The third preferred embodiment provides repair wires to repair the gate transmitting wires 137 that are broken in the above-mentioned scribing and breaking process.

Figure 9:
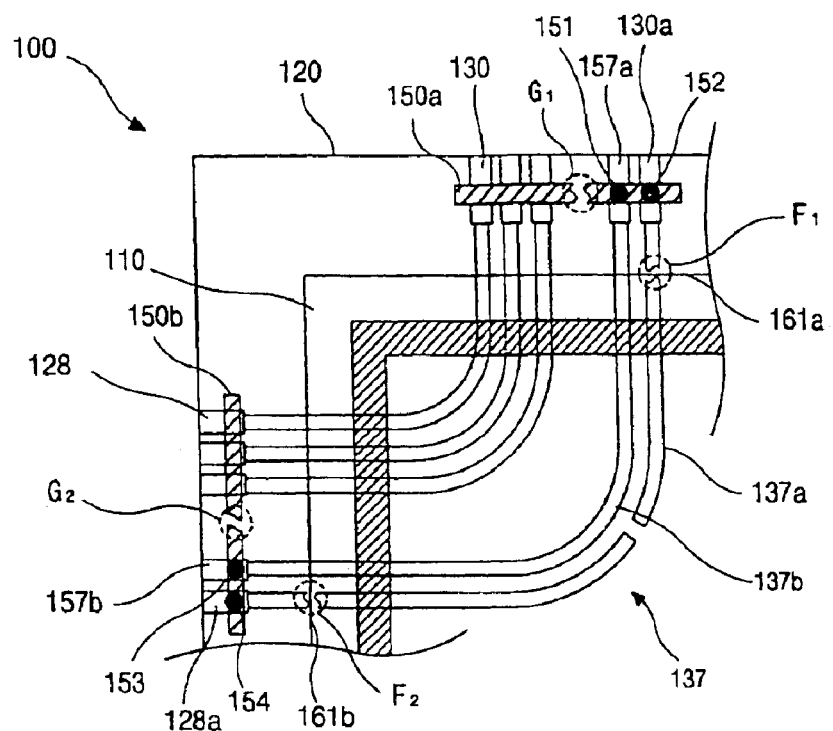
FIG. 9 is a partial expanded view of a liquid crystal display device according to a third preferred embodiment of the present invention.

Now, with reference to FIG. 9, the third preferred embodiment is explained.

As shown, adjacent to each gate pad 128 and each source pad 130, a gate dummy pad 157b and a source dummy pad 157a are formed respectively. Across the source pads 130 and the source dummy pads 157a, a first repair wire 150a is formed with an insulating layer (not shown) interposed between the pads and the repair wire. Similarly, a second repair wire 150b is formed across the gate pads 128 and the gate dummy pads 157a with the insulating layer interposed between the pads and the repair wire. The source and gate dummy pads 157a and 157b are electrically connected via a dummy wire 137b that has the same material as the gate transmitting wires 137.

Since a mechanical impact or vibration acts on the upper substrate in the above-mentioned scribing and breaking process, open defects occur in the gate transmitting wire 137 along first and second edges 161a and 161b of the upper substrate 110. For example, first and second open defects $F_1$ and $F_2$ of the last gate transmitting wire 137a occur, respectively, near the first and second edges 161a and 161b of the upper substrate 110.

To repair the broken transmitting wire 137a, the first repair wire 150a is welded with a last source pad 130a and the adjacent source dummy pad 157a at their first and second cross points 151 and 152. In addition, the second repair wire 150b is welded with a last gate pad 128a and the adjacent gate dummy pad 157b at their third and fourth cross points 153 and 154.

Figure 1:
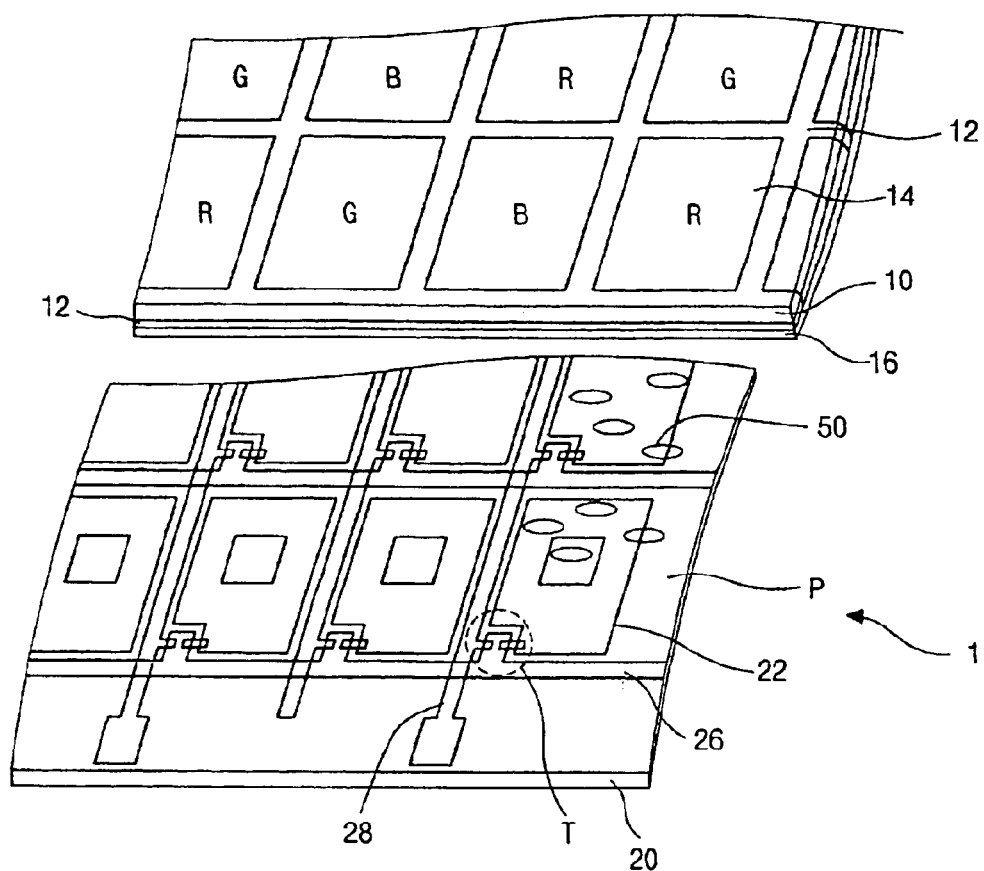
FIG. 1 is a perspective view illustrating a conventional LCD device.
Figure 2:
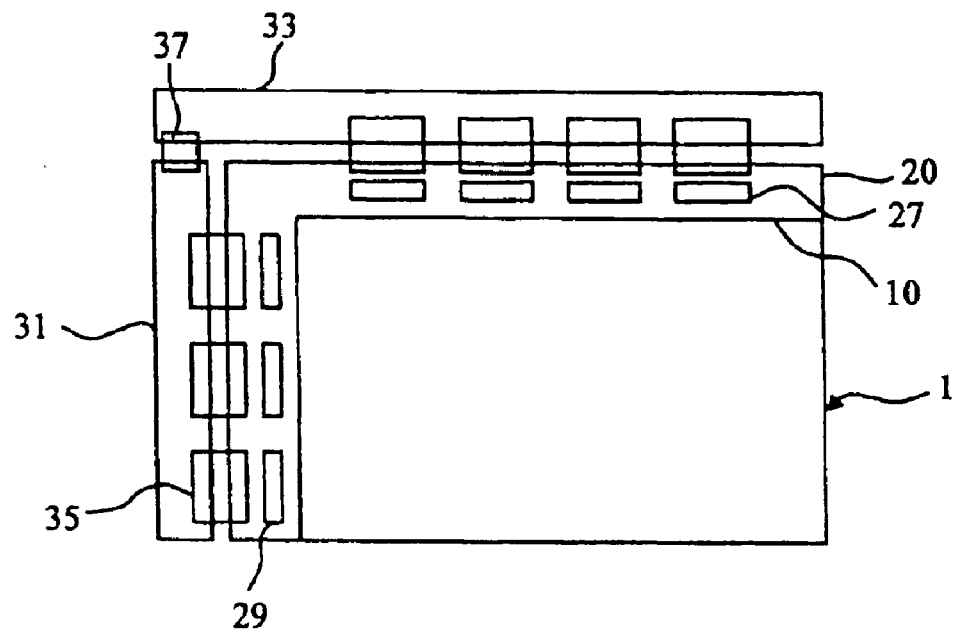
FIG. 2 is a plan view of the conventional liquid crystal display device adopting a COG method.
Figure 3:
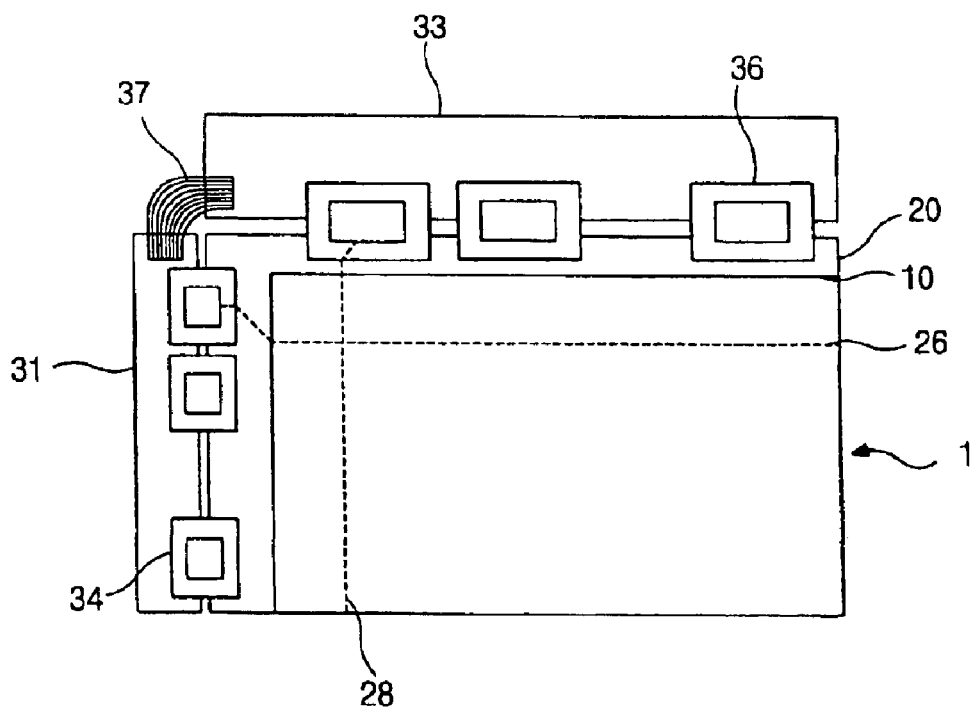
FIG. 3 is a plan view of the conventional liquid crystal display device adopting a TCP method.
Figure 4:
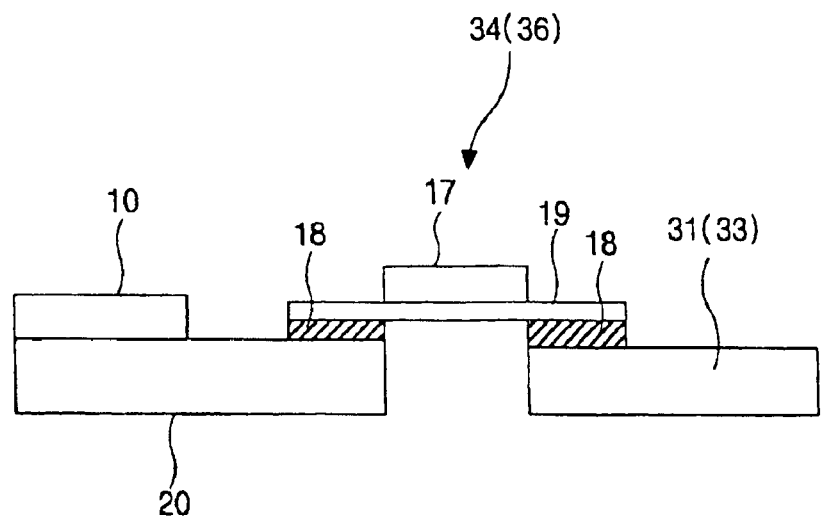
FIG. 4 is a side view of the TCP of FIG. 3.

By the above-mentioned welding, the first repair wire 150a electrically connect the last source pad 130a of the broken gate transmitting wire 137a with the adjacent source dummy pad 157a, and the second repair wire 150b electrically connect the last gate pad 128a of the broken gate transmitting wire 137a with the adjacent gate dummy pad 157b. Accordingly, a voltage signal corresponding to the broken gate transmitting wire 137a is transmitted again from the source PCB 133 of FIG. 3 to the gate PCB 131 of FIG. 3 via the gate and source dummy pads 157a and 157b and the dummy line 137b.

When another gate transmitting wire is also broken, the first and second repair wires 150a and 150b are respectively cut at first and second separation points $G_1$ and $G_2$ that are respectively adjacent to the first and third cross points 151 and 153. Thereafter, the above-mentioned repair process is repeated for another broken gate transmitting wire to transmit the voltage signals via another dummy wire.

Fourth Preferred Embodiment

Figure 10A:
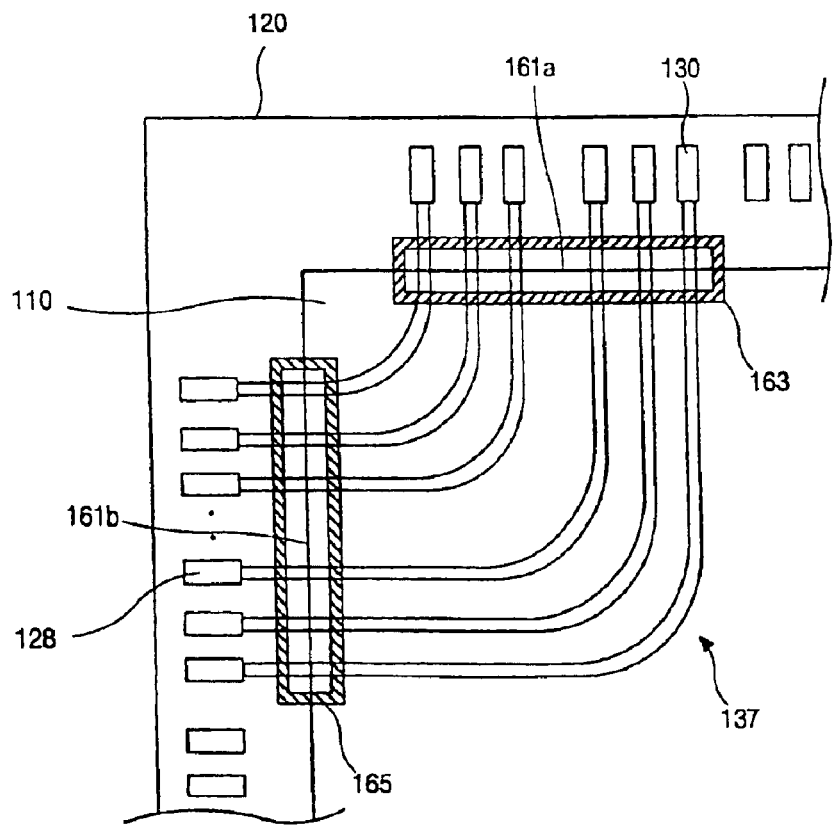
FIG. 10A is a partial expanded view of a liquid crystal display device according to a fourth preferred embodiment of the present invention.

As shown in FIG. 10A, first and second repair wires 163 and 165 are formed in shape of a closed roof along the first and second edges 161a and 161b of the upper substrate 110 and across the gate transmitting wires 137 with an insulating layer (not shown) interposed between the repair wires and the gate transmitting wires. The first and second repair wires 163 and 165 preferably have the same material as the gate transmitting wires 137. At this point, one side of the first and second repair wires 163 and 165 is preferably positioned outside the upper substrate 110, while another side of the first and second repair wires 163 and 165 is preferably positioned inside the upper substrate 110.

Figure 10B:
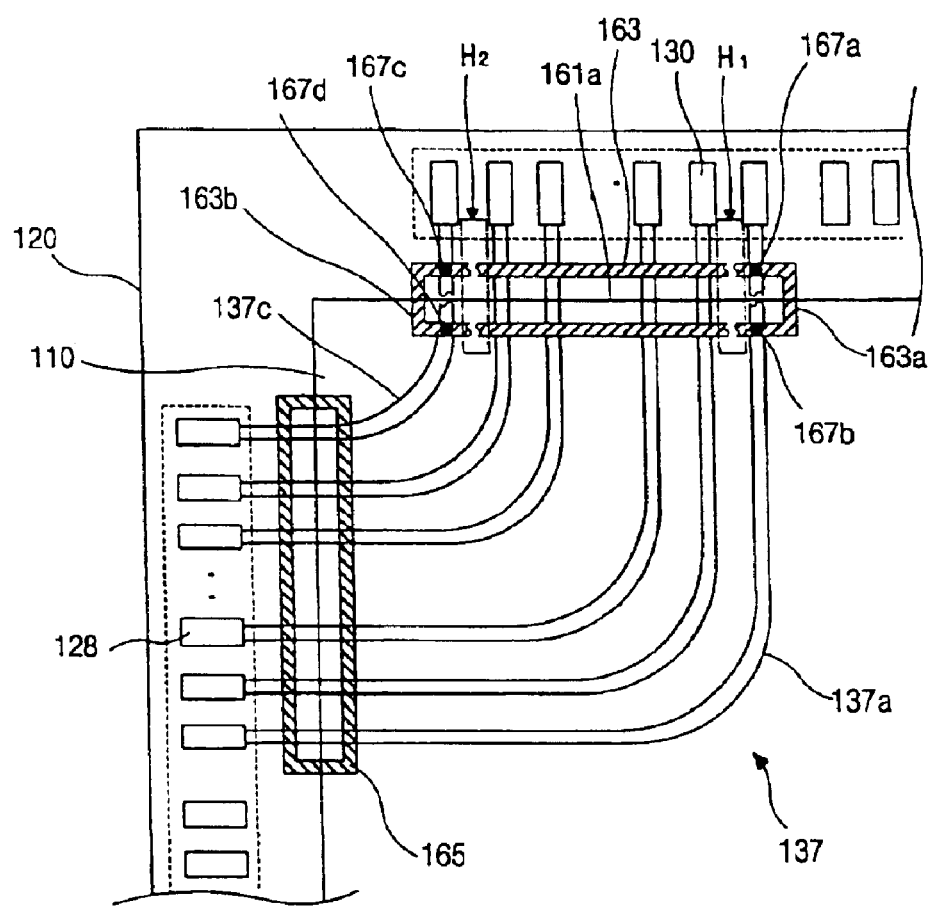
FIG. 10B illustrates a repair method by the fourth preferred embodiment of FIG. 10A.

In FIG. 10B, first and last gate transmitting wires 137c and 137a have short lines near the first edge 161a of the upper substrate 110. To repair the first and last gate transmitting wires 137c and 137a, the first repair wire 163 is welded with the first and last gate transmitting wires 137c and 137a at their first to fourth cross points 167a to 167d. Thereafter, first and second portion H1 and H2 of the first repair wire 163 are cut to separate first and second separated wires 163a and 163b from the first repair wire 163.

Since the first and second separated wires 163a and 163b respectively connect the first and last broken gate transmitting wires 137c and 137a, voltage signals are successfully transmitted via the first and last gate transmitting wires 137c and 137a from the source pads 130 to the gate pads 128.

Fifth Preferred Embodiment

Figure 11A:
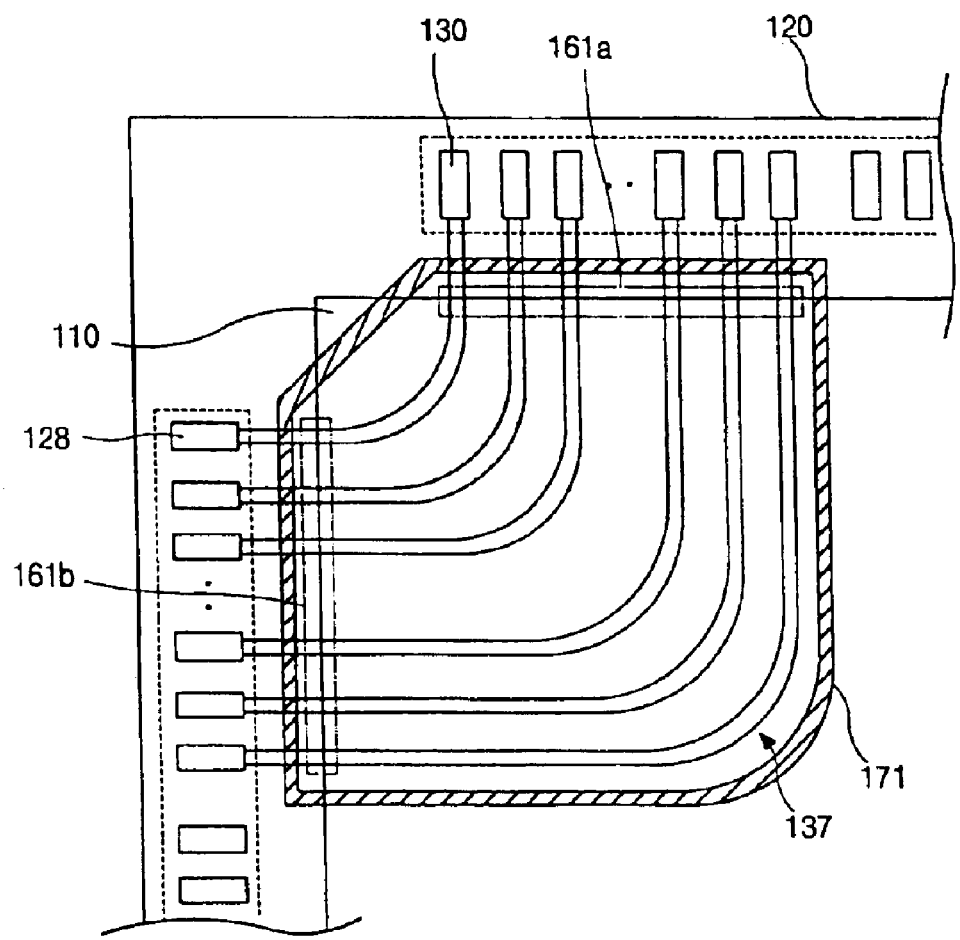
FIG. 11A is a partial expanded view of a liquid crystal display device according to a fifth preferred embodiment of the present invention.

As shown in FIG. 11A, a repair wire 171 in shape of a closed roof is formed over the gate transmitting wires 137 with an insulating layer (not shown) interposed therebetween. The repair wire 171 crosses with each of the gate transmitting wires 171 at two different cross points between the repair wire and the gate transmitting wire. Each cross point between the repair wire 171 and the gate transmitting wires 137 is preferably located outside the first and second edges 161a and 161b of the upper substrate 110. The repair wire preferably has the same material as the gate transmitting wire.

Figure 11B:
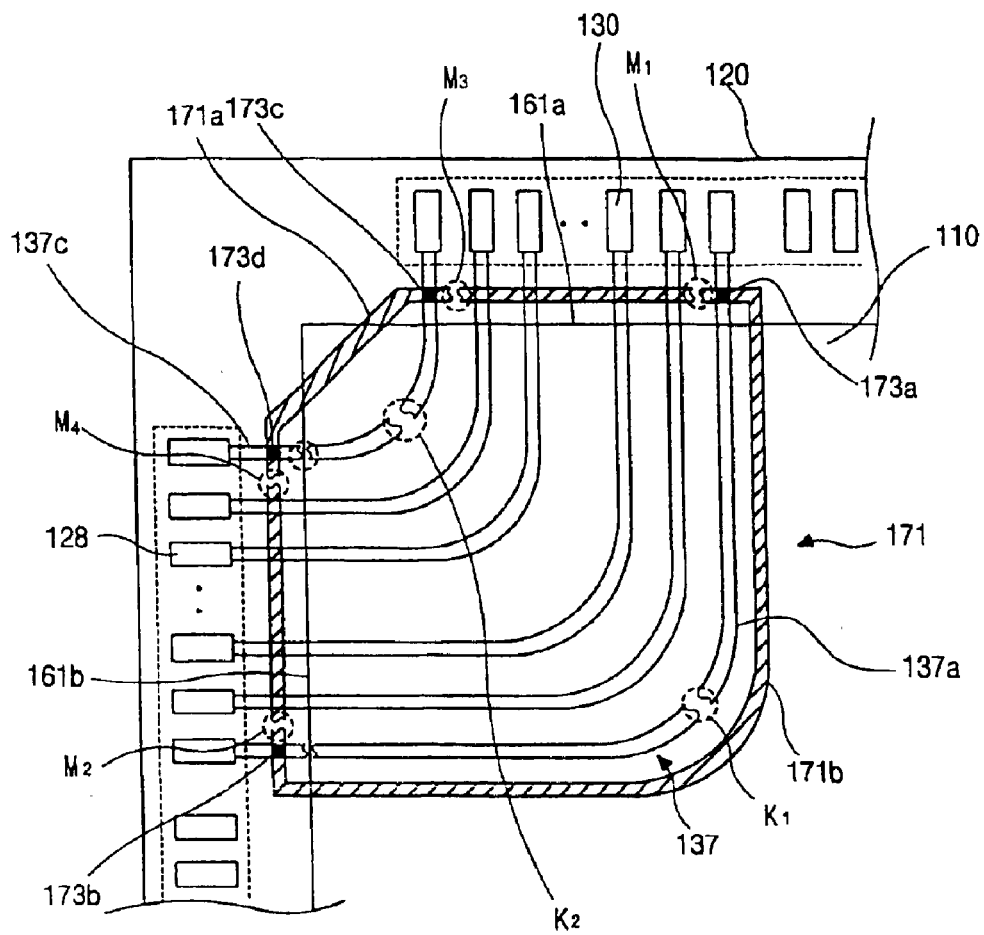
FIG. 11B illustrates a repair method by the fifth preferred embodiment of FIG. 11A.

In FIG. 11B, the first and last gate transmitting wires 137c and 137a have short lines $K_1$ and $K_2$ respectively. To repair the first and last gate transmitting wires 137c and 137a, the repair wire 171 is welded with the first and last gate transmitting wires 137c and 137a at their first to fourth cross points 173a to 173d. Thereafter, first to fourth portions M1 to M4 of the repair wire 171 are cut away such that first and second separated wires 171a and 171b are separated from the repair wire 171. Therefore, the first and second separated wires 171a and 171b become electrically independent of each other and the remaining portion of the repair wire 171.

Via the first and second separated wires 171a and 171b, different voltage signals are transmitted from the source pads 130 to the gate pads 128 successfully.

If only one gate transmitting wire 137 is broken, after welding the broken transmitting wire with the repair wire, the repair wire is preferably cut at two different points of itself such that the separated wire compensating for the broken gate transmitting wire has the shortest length. Namely, when the broken gate transmitting wire is electrically connected via the separated wire of the repair wire, the length of the separated wire prefers to be the shortest such that a resistance between the source and gate pads becomes the lowest not to affect the voltage signals abnormally.

Figure 12:
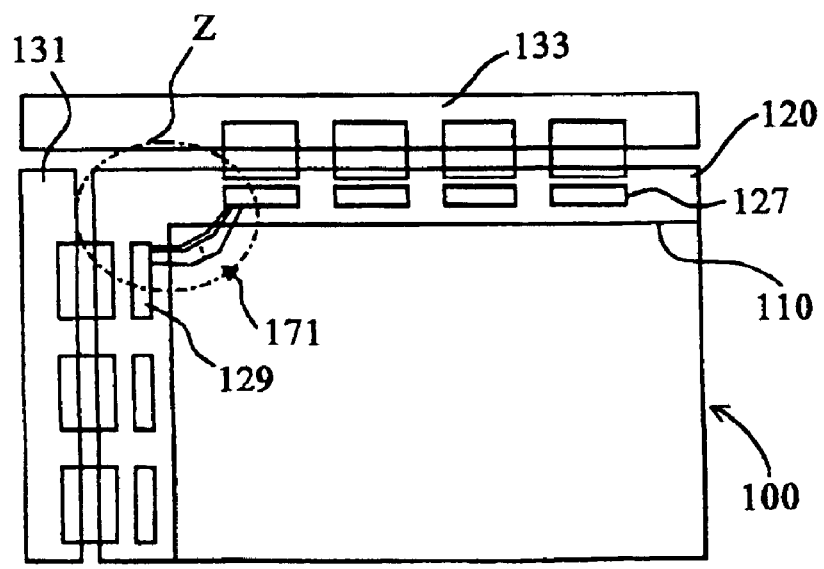
FIG. 12 is a plane view of a COG type liquid crystal display device according to the first preferred embodiment of the present invention.

The above-mentioned first to fifth preferred embodiments of the present invention are also applicable for a COG typed LCD device. FIG. 12 is a plane view of the COG typed LCD device according to the first preferred embodiment of the present invention.

As shown, data and gate drive circuits 127 and 129 are formed on edges of the lower substrate 120, and the gate transmitting wires 171 electrically connect data drive circuits 127 with the gate drive circuits 129. Via the gate transmitting wires 171, voltage signals are transmitted from the source PCB 133 to the gate PCB 131. The gate transmitting wires 171 are preferably positioned at a corner "Z" of the upper substrate 110 such that the gate transmitting wire is away from a display area of the LCD device.

Figure 13A:
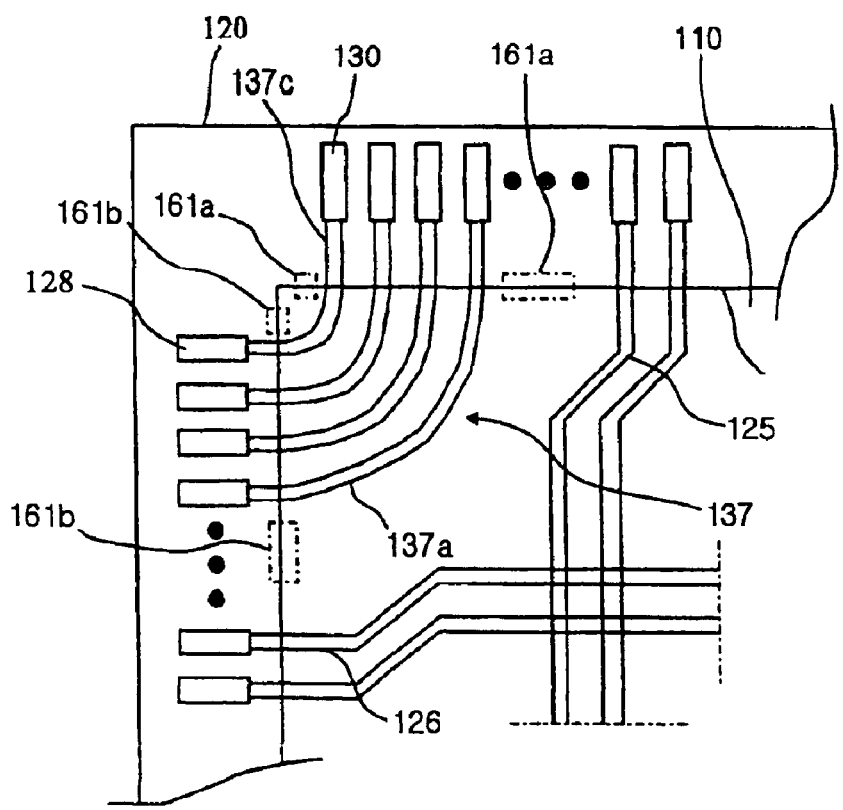
FIGS. 13A and 13B are expanded plane views of a portion "Z" of FIG. 12.
Figure 13B:
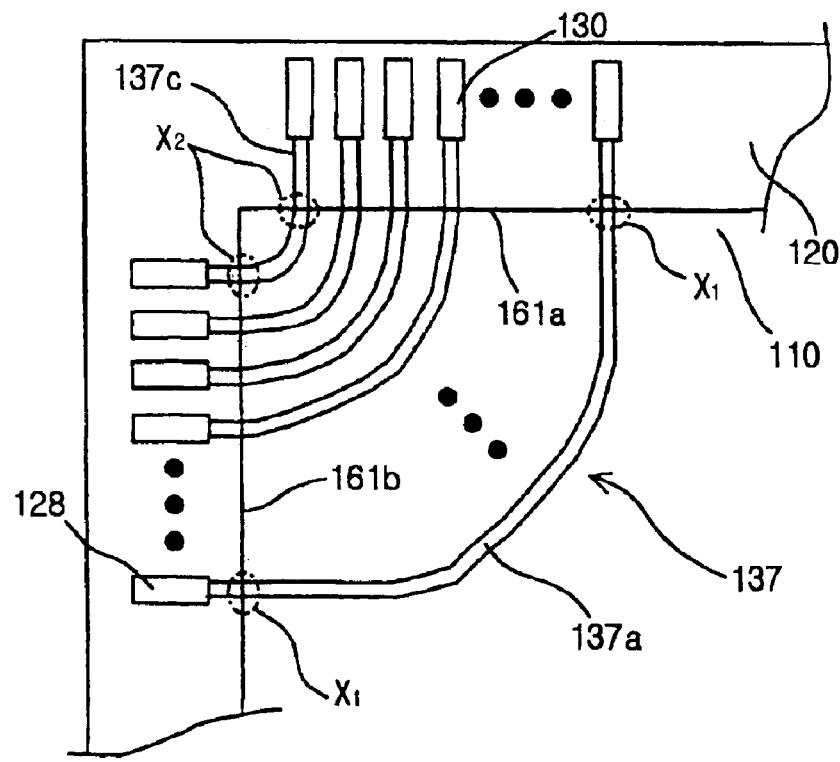

FIGS. 13A and 13B are expanded plane view of the corner "Z" of FIG. 12.

On the lower substrate 120, a plurality of data lines 125 and gate lines 126 are formed in shape of a matrix array, and each of the data lines 125 and each of the gate lines 126 are electrically connected, respectively, with the source and gate pads 130 and 128. Further, the gate transmitting wires 137 electrically connect the source pads 130 with the gate pads 128 such that voltage signals are transmitted from the source PCB 133 of FIG. 12 to the gate PCB 131 of FIG. 12. The last gate transmitting wire 137a is spaced apart from the data and gate lines 125 and 126.

In an actual process of fabricating the above-mentioned LCD panel, on a plurality of the lower substrate 120 including the above-mentioned wires, a large-sized substrate is attached via the sealant 141 of FIG. 6, and the large-sized substrate is scribed and broken by force to form a plurality of independent LCD panels. After the scribing and breaking process, the source and gate pads 130 and 128 are respectively connected with the source and gate PCBs 133 and 131 of FIG. 12.

Namely, in the above-mentioned scribing and breaking process, the first and second edges 161a and 161b of the upper substrate 110 are acted on by the above-mentioned force of scribing and breaking. The scribing and breaking force further acts on the first and last gate transmitting wires 137b and 137a. Specifically, as shown in FIG. 13B, cross portions $X_1$ and $X_2$ where the gate transmitting wires cross with the edges of the upper substrate 110 are most acted on by the scribing and breaking force such that the first and last gate transmitting wires 137b and 137a are broken at the cross portions $X_1$ and $X_2$.

Though the above-mentioned open defects are easily repaired by the third to fifth preferred embodiments of the present invention, a more safety should be confirmed to prevent the open defects of the gate transmitting wires.

Sixth Preferred Embodiment

In the sixth preferred embodiment, dummy patterns are used to prevent the above-mentioned open defects.

Figure 14:
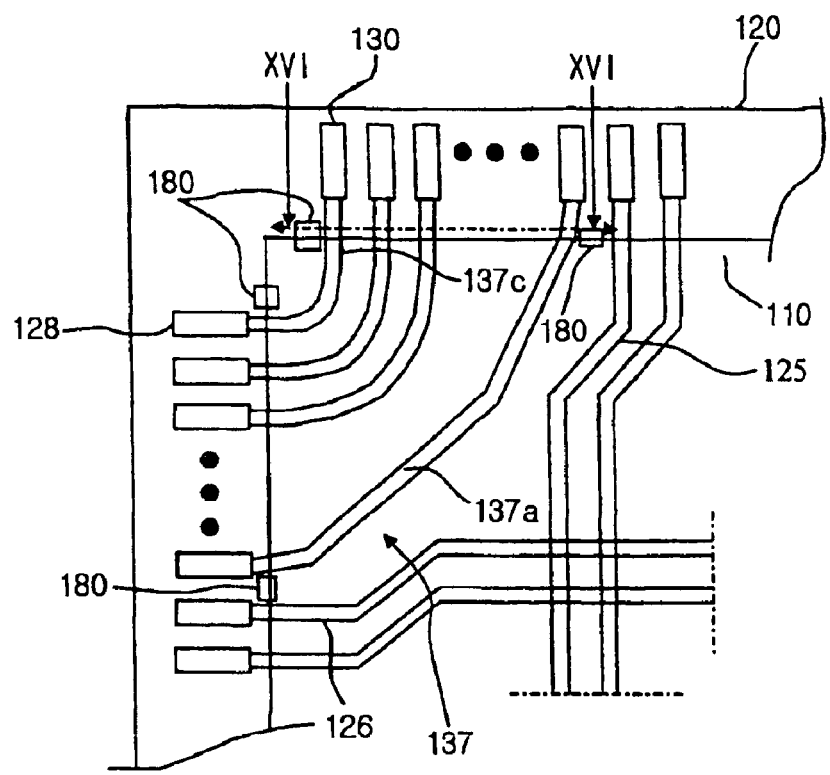
FIG. 14 is a partial expanded plane view of a liquid crystal display device according to a sixth preferred embodiment of the present invention.

As shown in FIG. 14, a plurality of dummy patterns 180 are formed on the lower substrate 120 such that the position of the dummy patterns 180 correspond to the position of the first and second edges 161a and 161b (see FIG. 12) of the upper substrate 110.

In detail, the dummy patterns 180 are formed adjacent the first and last gate transmitting wires 137c and 137a. The dummy patterns 180 preferably have at least the same height as the gate transmitting wires 137c and 137a such that most of the above-mentioned scribing and breaking force is acted on the dummy patterns 180 instead of the gate transmitting wires 137c and 137a.

Figure 15A:
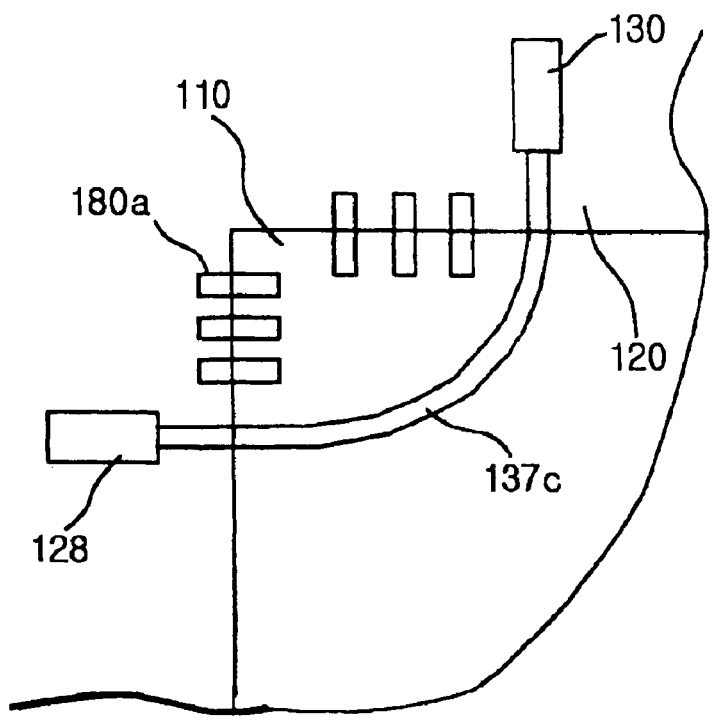
FIGS. 15A and 15B are partial expanded plane views of FIG. 14.
Figure 15B:
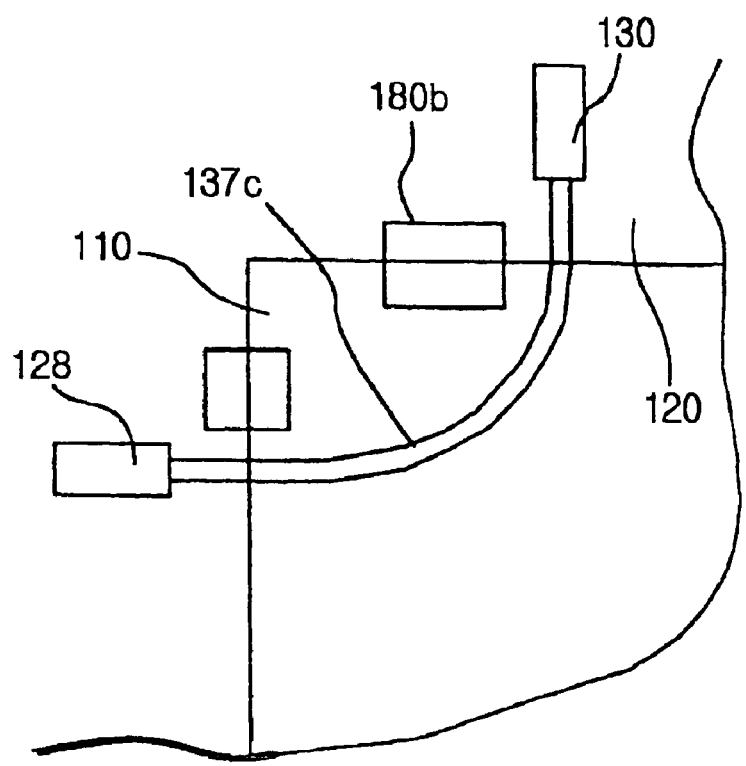

FIGS. 15A and 15B show different shapes of the dummy patterns 180.

In FIG. 15A, each dummy pattern 180a includes smaller patterns that are aligned closely, while FIG. 15B shows that each dummy pattern 180b includes only one body.

Figure 16A:
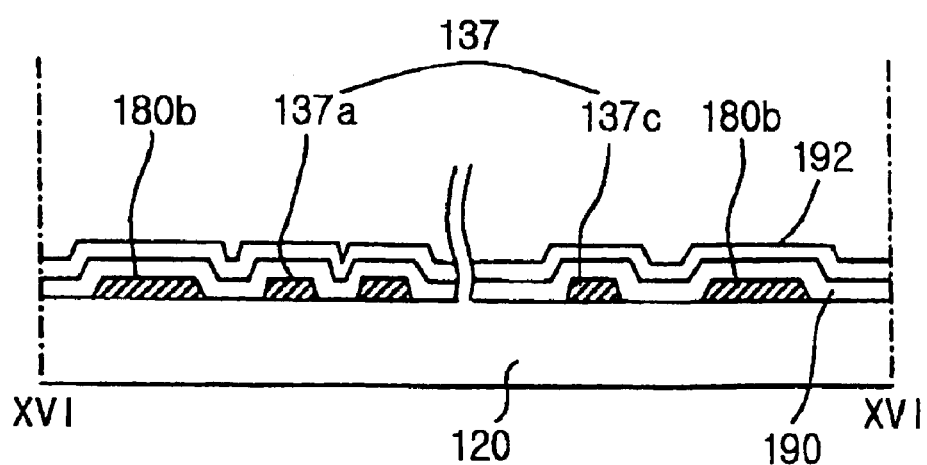
FIGS. 16A and 16B are cross-sectional views taken along a line "XVI—XVI" of FIG. 14.

FIG. 16A is a cross-sectional view taken along a line "XVI—XVI" of FIG. 14. With reference to FIG. 16, a fabricating process of an array substrate having an inverted staggered type TFT is explained.

First, on the lower substrate 120, the gate and source pads 128 and 130 (see FIG. 14), the gate lines 126 (see FIG. 14), and gate electrodes (not shown) that are electrically connected with the gate lines 126 (see FIG. 14) are formed. At the same time, the gate transmitting wires 137 are formed to electrically connect some of the gate and source pads 128 and 130 (see FIG. 14) that are specifically positioned near the corner "Z" of FIG. 12. Further, the dummy patterns 180b are formed adjacent the last and first gate transmitting wires 137a and 137b. The position of the dummy patterns 180b correspond to the edges of the upper substrate 110 (see FIG. 14) that will be attached to the lower substrate 120, scribed and broken in a later process. At this point, a portion of each dummy pattern 180b will be overlapped by the upper substrate 110.

Next, a gate insulating layer 190 are formed to cover the gate lines and the gate transmitting wires 137. Thereafter, not shown in FIG. 16A, source and drain electrodes, and a plurality of data lines 125 (see FIG. 14) will be formed on the gate insulating layer 190. The gate, source and drain electrodes are included in a switching device such as a thin film transistor (TFT).

Finally, a passivation layer 192 is formed on an overall surface of the lower substrate 120 where the data lines and the like are formed, and a plurality of pixel electrodes (not shown) are formed on the passivation layer 192.

Figure 16B:
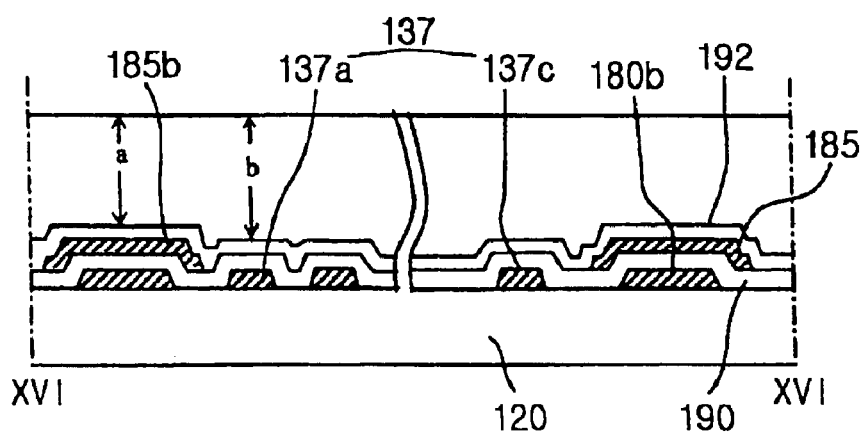

Though each dummy pattern 180b of FIG. 16A has at least the same height as the gate transmitting wire 137, it is preferred that the height of each dummy pattern 180b is bigger than that of the gate transmitting wire 137, as shown in FIG. 16B.

In FIG. 16B, between the dummy patterns 180b and the passivation layer 192, auxiliary dummy patterns 185 are interposed in shape of islands such that a first height "a" measured from the upper substrate 110 to the auxiliary dummy pattern 185 is smaller than a second height "b" measured from the upper substrate 110 to the gate transmitting wire 137. In this case, since the auxiliary dummy patterns 185 and the dummy patterns 180b absorb most of the scribing and breaking force in the scribing and breaking process, the gate transmitting wires 137 are protected from the mechanical impact or vibration of a cutting device used for the scribing and breaking process.

As described herein-before, by manufacturing the LCD device according to the preferred embodiments of the present invention, since the gate transmitting wires substitute for the FPC, the material cost becomes lower and the fabrication yield becomes higher. Further, due to the repair wires, the open defects of the gate transmitting wires are easily repaired. Furthermore, due to the dummy pads, the open defects of the gate transmitting wires are prevented.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display device comprising:

upper and lower substrates with a liquid crystal layer interposed therebetween;

a sealant between the upper and lower substrates in an area near an edge of the upper substrate;

a plurality of source and gate pads on the lower substrate;

a plurality of gate and data lines on the lower substrate, each gate line being electrically connected with the corresponding gate pad, each data line being electrically connected with the corresponding source pad;

a gate insulating layer between the gate lines and the data lines;

a source PCB and a gate PCB electrically connected with the plurality of source pads and the plurality of gate pads, respectively, the source PCB and the gate PCB being formed along a first side and a second side, respectively, of the lower substrate and outside the area in which the sealant is formed such that the upper substrate is not formed over the source PCB or the gate PCB, wherein the first and second sides meet at a corner of the lower substrate; and a plurality of transmitting wires on the lower substrate, the transmitting wires directly connecting the gate and source pads across the sealant such that the source PCB is electrically connected with the gate PCB in the vicinity of the corner of the lower substrate, wherein the plurality of transmitting wires are formed in a curved shape on the lower substrate from the gate pads to the source pads.

2. The device of claim 1, further comprising a plurality of switching devices.

3. The device of claim 1, wherein the transmitting wires include at least eight electrical wires.

4. The device of claim 1, further comprising a plurality of dummy pads between the adjacent gate pads and between the adjacent source pads.

5. A liquid crystal display device comprising:
upper and lower substrates with a liquid crystal layer interposed therebetween;
a sealant between the upper and lower substrates in an area near an edge of the upper substrate;
a plurality of source and gate pads on the lower substrate;
a plurality of gate and data lines on the lower substrate, each gate line being electrically connected with the corresponding gate pad, each data line being electrically connected with the corresponding source pad;
a gate insulating layer between the gate lines and the data lines;
a source PCB and a gate PCB electrically connected with the plurality of source pads and the plurality of gate pads, respectively, the source PCB and the gate PCB being formed outside the area in which the sealant is formed such that the upper substrate is not formed over the source PCB or the gate PCB; and
a plurality of transmitting wires on the lower substrate, the transmitting wires being electrically connected with the gate and source pads across the sealant such that the source PCB is electrically connected with the gate PCB, further comprising a repair wire crossing with each gate transmitting wire with the gate insulating layer interposed between the repair wire and the gate transmitting wire.

6. A liquid crystal display device, comprising:
upper and lower substrates with a liquid crystal layer interposed therebetween;
a sealant between the upper and lower substrates;
a plurality of source and gate pads on the lower substrate;
a plurality of gate and data lines on the lower substrate, each gate line being electrically connected with the corresponding gate pad, each data line being electrically connected with the corresponding source pad;
a gate insulating layer between the gate lines and the data lines;
a source PCB electrically connected with the plurality of source pads;
a gate PCB electrically connected with the plurality of gate pads;
a plurality of transmitting wires on the lower substrate, the transmitting wires being electrically connected with the gate and source pads across the sealant such that the source PCB is electrically connected with the gate PCB; and
a repair wire crossing with each gate transmitting wire with the gate insulating layer interposed between the repair wire and the gate transmitting wire, wherein a specific resistance of the repair wire is below 10 $\mu\Omega$/cm inclusive.

7. The device of claim 5, wherein the repair wire is positioned in a region defined by the sealant.

8. The device of claim 5, wherein the repair wire is positioned across the sealant.

9. A liquid crystal display device, comprising:
upper and lower substrates with a liquid crystal layer interposed therebetween;
a sealant between the upper and lower substrates;
a plurality of source and gate pads on the lower substrate;
a plurality of gate and data lines on the lower substrate, each gate line being electrically connected with the corresponding gate pad, each data line being electrically connected with the corresponding source pad;
a gate insulating layer between the gate lines and the data lines;
a source PCB electrically connected with the plurality of source pads;
a gate PCB electrically connected with the plurality of gate pads;
a plurality of transmitting wires on the lower substrate, the transmitting wires being electrically connected with the gate and source pads across the sealant such that the source PCB is electrically connected with the gate PCB; and
a repair wire crossing with each gate transmitting wire with the gate insulating layer interposed between the repair wire and the gate transmitting wire, wherein the repair wire includes first and second closed roofs, the first closed roof being formed along first edge of the upper substrate, the second closed roof being formed along second edge of the upper substrate.

10. A liquid crystal display device comprising;
upper and lower substrates with a liquid crystal layer interposed therebetween;
a sealant between the upper and lower substrates in an area near an edge of the upper substrate;
a plurality of source and gate pads on the lower substrate;
a plurality of gate and data lines on the lower substrate, each gate line being electrically connected with the corresponding gate pad, each data line being electrically connected with the corresponding source pad;
a gate insulating layer between the gate lines and the data lines;
a source PCB and a gate PCB electrically connected with the plurality of source pads and the plurality of gate pads, respectively, the source PCB and the gate PCB being formed outside the area in which the sealant is formed such that the upper substrate is not formed over the source PCB or the gate PCB;
a plurality of transmitting wires on the lower substrate, the transmitting wires being electrically connected with the gate and source pads across the sealant such that the source PCB is electrically connected with the gate PCB; and
a first and second repair wire, the first repair wire crossing with each of the source pads with the gate insulating layer interposed therebetween, the second repair wire crossing with each of the gate pads with the gate insulating layer interposed therebetween.

11. The device of claim 10, wherein a specific resistance of the first and second repair wires is below 10 $\mu\Omega$/cm inclusive.

12. A liquid crystal display device comprising:
upper and lower substrates with a liquid crystal layer interposed therebetween;
a sealant between the upper and lower substrates in an area near an edge of the upper substrate;
a plurality of source and gate pads on the lower substrate;
a plurality of gate and data lines on the lower substrate, each gate line being electrically connected with the corresponding gate pad, each data line being electrically connected with the corresponding source pad;
a gate insulating layer between the gate lines and the data lines;
a source PCB and a gate PCB electrically connected with the plurality of source pads and the plurality of gate pads, respectively, the source PCB and the gate PCB being formed outside the area in which the sealant is formed such that the upper substrate is not formed over the source PCB or the gate PCB;

a plurality of transmitting wires on the lower substrate, the transmitting wires being electrically connected with the gate and source pads across the sealant such that the source PCB is electrically connected with the gate PCB; and first and second dummy patterns on the lower substrate, the first dummy pattern being positioned along a first edge of the upper substrate, the second dummy pattern being positioned along a second edge of the upper substrate, the each dummy pattern having at least the same height as the gate transmitting wire.

13. The device of claim 12, further comprising auxiliary dummy patterns over the first and second dummy patterns.

14. A method of fabricating a liquid crystal display device, the method comprising:

preparing first and second substrates;

forming a plurality of gate lines, gate pads, gate transmitting wires, and dummy patterns on the first substrate;

forming a gate insulating layer on the gate lines, gate pads, gate transmitting wires, and dummy patterns;

forming a plurality of data lines and data pads on the gate insulating layer;

forming a passivation layer on the data lines and the data pads;

forming a sealant on the first substrate, wherein the gate transmitting wires directly connect the gate pads to the source pads across the sealant in the vicinity of a corner of the first substrate, and wherein the gate transmitting wires are formed in a curved shape on the lower substrate from the gate pads to the source pads;

attaching the first and second substrates;

scribing and breaking the second substrate; and forming a liquid crystal layer between the first and second substrates.

* * * * *